US012128529B1

(12) United States Patent
Lark

(10) Patent No.: US 12,128,529 B1
(45) Date of Patent: Oct. 29, 2024

(54) LOCK-IT SOCKET

(71) Applicant: David Butler Lark, Kingsley, MI (US)

(72) Inventor: David Butler Lark, Kingsley, MI (US)

( * ) Notice: Subject to any disclaimer, the term of this patent is extended or adjusted under 35 U.S.C. 154(b) by 0 days.

(21) Appl. No.: 18/633,263

(22) Filed: Apr. 11, 2024

Related U.S. Application Data

(60) Provisional application No. 63/499,124, filed on Apr. 28, 2023.

(51) Int. Cl.
*B25B 13/48* (2006.01)
*B25B 23/00* (2006.01)

(52) U.S. Cl.
CPC .......... *B25B 13/48* (2013.01); *B25B 23/0035* (2013.01); *B25B 23/0057* (2013.01)

(58) Field of Classification Search
CPC ......... B25B 13/02; B25B 13/04; B25B 13/06; B25B 13/065; B25B 13/08; B25B 13/461; B25B 13/48; B25B 13/481; B25B 13/485; B25B 13/488; B25B 13/56; B25B 13/58; B25B 21/00; B25B 21/002; B25B 23/00; B25B 23/0035; B25B 23/0021; B25B 23/0057; B25B 23/08; B25B 23/142; B25B 27/0035; B25B 23/0007; B25B 15/02; B25B 17/00
See application file for complete search history.

(56) References Cited

U.S. PATENT DOCUMENTS

| | | | | | |
|---|---|---|---|---|---|
| 2,651,229 | A * | 9/1953 | Bernhart | B25B 23/0057 81/124.1 |
| 4,535,657 | A * | 8/1985 | Farris | B25B 23/0057 81/124.1 |
| 5,437,211 | A | 8/1995 | Wolfe | |
| 5,992,272 | A | 11/1999 | Fortner | |
| 9,272,395 | B2 * | 3/2016 | Hui | B25B 13/065 |
| 9,844,866 | B2 * | 12/2017 | Langdon, Jr. | B25B 31/00 |
| 2006/0027057 | A1 | 2/2006 | Hsien | |

* cited by examiner

*Primary Examiner* — Robert J Scruggs

(57) ABSTRACT

The device is a multi-purpose drive socket capable of engaging both a penta-bolt and a hex-bolt. The device is specially adapted for use in the utility industry where multiple tools are typically needed for securing electrical equipment. The device contains a retractable plunger that slides in and out of the head opening. To remove a penta-bolt, the user simply presses the plunger head up against the head of the penta-bolt, causing the plunger to retract back into the socket body. Once fully inserted, the user can loosen or tighten the penta-bolt. To remove a hex-bolt, the user inserts the hex-head into a recessed opening in the plunger head and tightens down the hex-bolt until the hex-head breaks off at the shank. In the event the hex-head remains lodged in the plunger, the device also contains an ejector pin capable of dislodging and removing the hex-head.

8 Claims, 13 Drawing Sheets

LOCK-IT SOCKET

FIELD OF THE INVENTION

The present invention relates generally to wrench sockets. More specifically, the present invention is a multi-use tool that can open/close and lock underground electrical equipment.

BACKGROUND OF THE INVENTION

In the utility industry, it is common practice to install underground electrical equipment in locked storage containers. For example, pad-mounted transformers are commonly seen in and around towns and cities. The average person may not know what purpose they serve, but he or she may recognize them as large, green utility boxes. These transformers help lower high voltage to standard household voltage in order to power electronics, appliances, and lighting. As with any other high energy equipment, only authorized employees (users) are permitted to work on pad-mounted transformers.

OSHA does not require that underground equipment doors be locked, but employers have a general duty to keep the public and employees safe from accidental contact with energized components. This is standard practice in the utility industry. Therefore, companies tighten down the factory provided penta bolt to secure the door closed and place a lock on the door. A popular lock used in the utility industry is a one-time use padlock commonly referred to as a "one-time lock." The reason it is called "one time" is because once the bolt is tightened, the head of the bolt breaks off, leaving the locked equipment inaccessible unless the user breaks the lock with a cutting tool.

As such, the user typically has to carry several tools just to gain access and subsequently lock the equipment doors. First, the user must cut the one-time lock off, grab a battery powered impact, and attach a standard penta socket. The user then uses the impact and socket to unscrew the penta bolt and perform work inside of the equipment. When finished, the closing process begins. The user uses the impact and a standard penta socket to screw down the equipment's door to its frame. Then, the user grabs the one-time lock and a pair of channel locks. There is a place on underground equipment, by the penta bolt, to secure the one-time lock. Once the one-time lock is set to be tightened, the employee uses the channel locks to tighten the bolt on the lock until the hex head of the bolt snaps off. Considering the number of tools being used and the work involved, a need exists to provide a more convenient way to open/close and lock the doors on underground electrical equipment.

It is an objective of the present invention to provide a solution to the aforementioned problems. The present invention is a 2-in-1 penta and ⅜" socket used to open/close and lock underground electrical equipment. The present invention allows the user to tighten or loosen the penta bolt, as well as tighten the one-time bolt to break off the hex head. An ejector pin is mounted within the device that allows the user to eject the hex head if it becomes stuck in the ⅜" socket.

SUMMARY OF THE INVENTION

It is an aim of the present invention to provide a multi-use tool that can open/close and lock underground electrical equipment. The present invention is a 2-in-1 socket that attaches to a socket wrench or power tool. The device comprises a socket body, a plunger, a spring, a guide screw, and an ejector pin. The plunger and spring are positioned inside the socket head, while the guide screw and ejector pin are positioned in the socket drive. The plunger is fastened to the guide screw, and the ejector pin is fastened to the socket body. Thus, the plunger is capable of sliding within the socket head opening, whereas the ejector pin remains fixed in place.

When ready to open or close the equipment doors, the user simply presses the plunger up against the penta bolt. The spring-loaded plunger retracts back into the head opening, allowing sufficient space to fit the penta bolt head. Once fully inserted, the user can tighten or loosen the penta bolt.

After closing the doors, the user can also use the same device for locking the doors. In particular, the spring-loaded plunger has a recessed opening shaped to fit the ⅜" hex head on the padlock. The user simply inserts the hex head into the recessed area on the plunger head, and then tightens down the hex bolt until the hex head breaks off.

In the event the hex head remains lodged inside the plunger after it is broken off, the user can also use the device to easily remove the broken-off hex head. The user simply presses down on the plunger head, causing the plunger to slide back into the socket body. Because the ejector pin remains fixed to the socket body, the tip of the ejector pin slides through a center opening in the plunger and knocks the hex head out of the plunger.

DETAIL DESCRIPTIONS OF THE INVENTION

All illustrations of the drawings are for the purpose of describing selected versions of the present invention and are not intended to limit the scope of the present invention.

Figure 8:
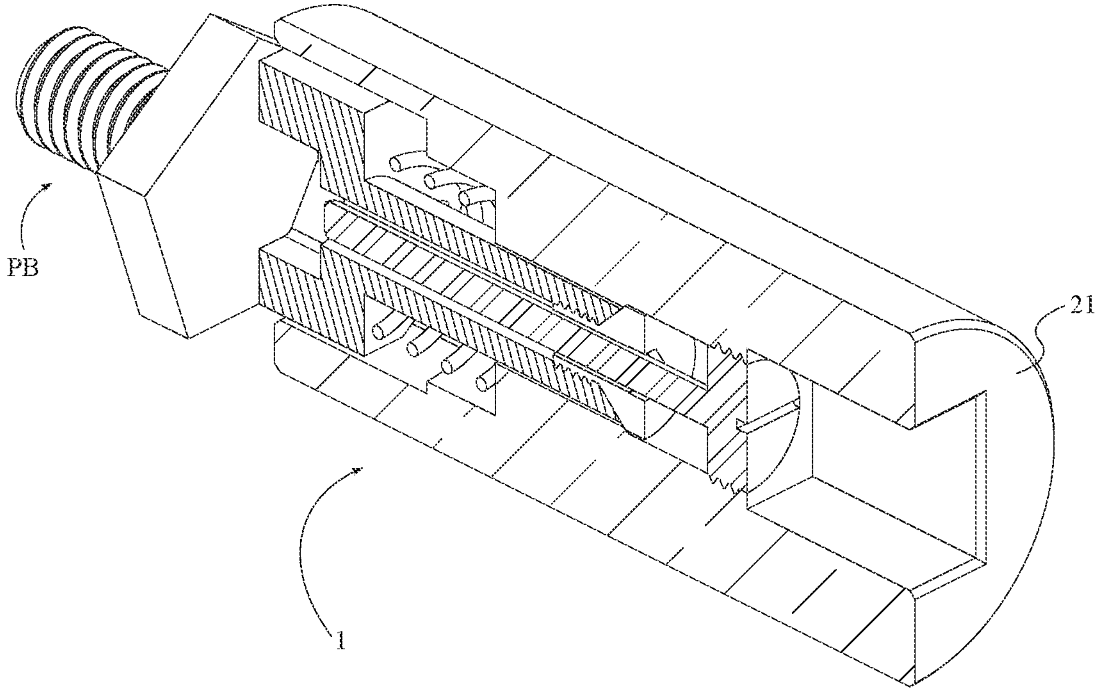
FIG. 8 is a perspective cutaway view of the present invention, shown with a penta-bolt.
Figure 9:
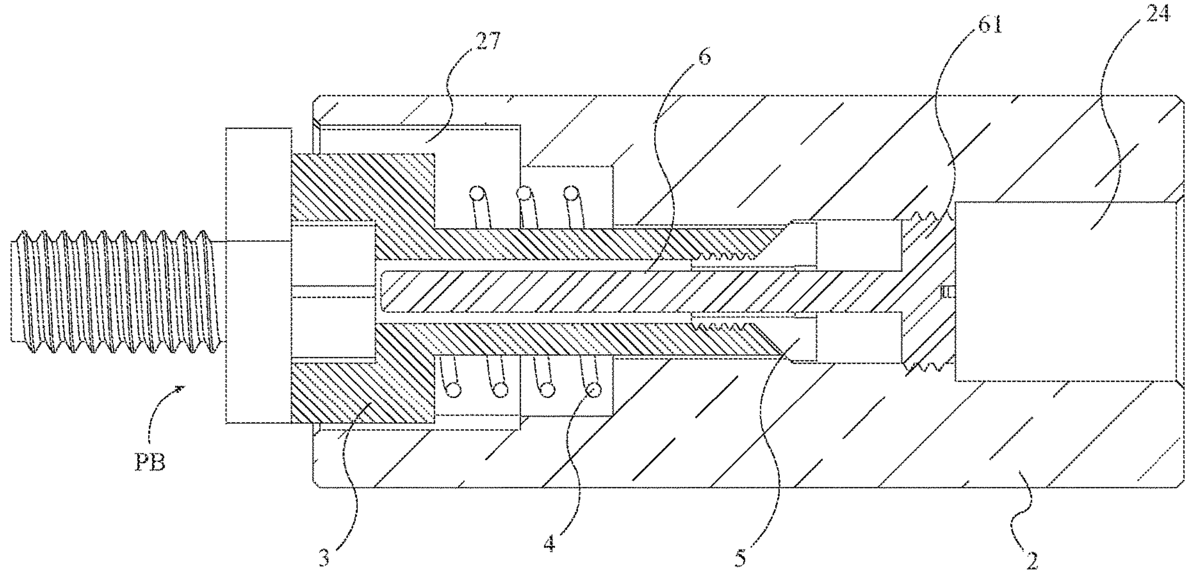
FIG. 9 is a front elevational view taken from FIG. 8, showing the plunger extended.
Figure 10:
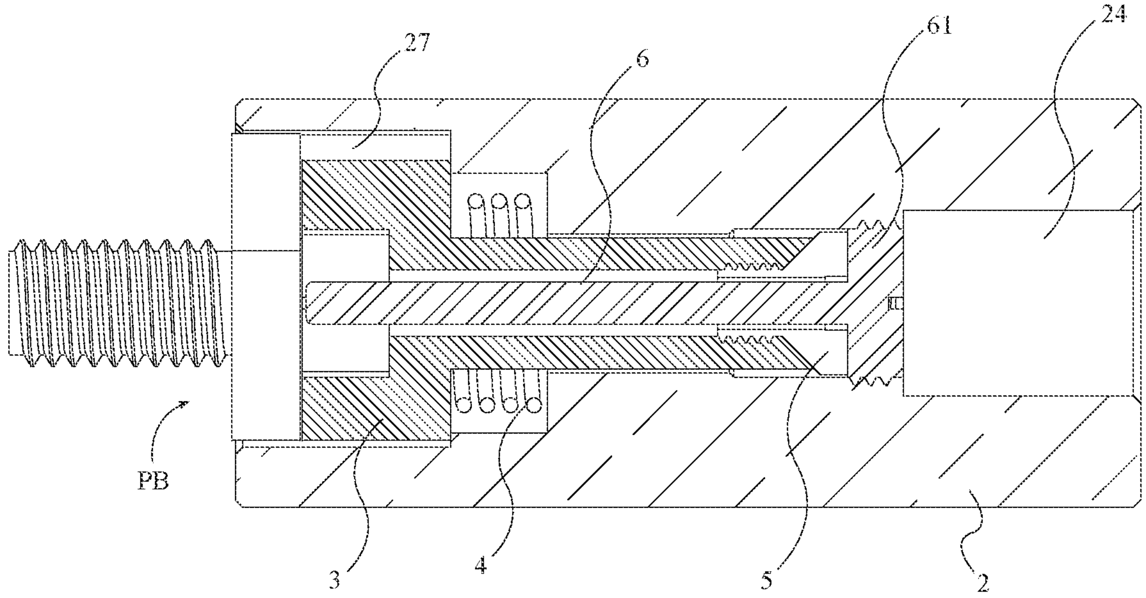
FIG. 10 is a front elevational view taken from FIG. 8, showing the plunger retracted.

In reference to FIGS. 1-13, the present invention is a 2-in-1 penta and ⅜" socket. It is an aim of the present invention to provide a multi-use tool that can open/close and lock underground electrical equipment. In particular, the device uses a standard drive socket for attaching to a socket wrench or power tool. The other end of the device uses a penta socket opening with a unique, spring-loaded plunger 3 housed inside. As the name implies, the penta socket opening is designed to fit a penta bolt commonly used in the industry for securing the doors on underground electrical equipment. As illustrated in FIGS. 8-10, the user simply attaches the head end 22 of the socket body 2 to the head of the penta-bolt PB. The spring-loaded plunger 3 retracts back into the socket body 2, allowing sufficient space to fit the penta bolt head, as seen in FIG. 10. Once fully inserted, the user can tighten or loosen the penta-bolt PB.

Figure 11:
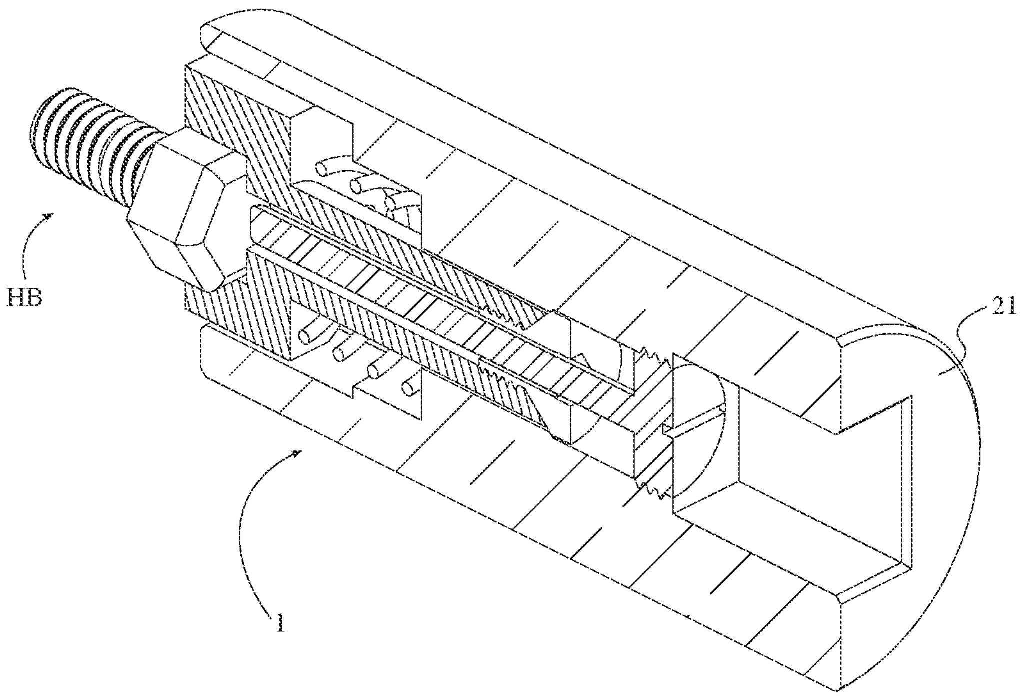
FIG. 11 is a perspective cutaway view of the present invention, shown with a hex-bolt.
Figure 12:
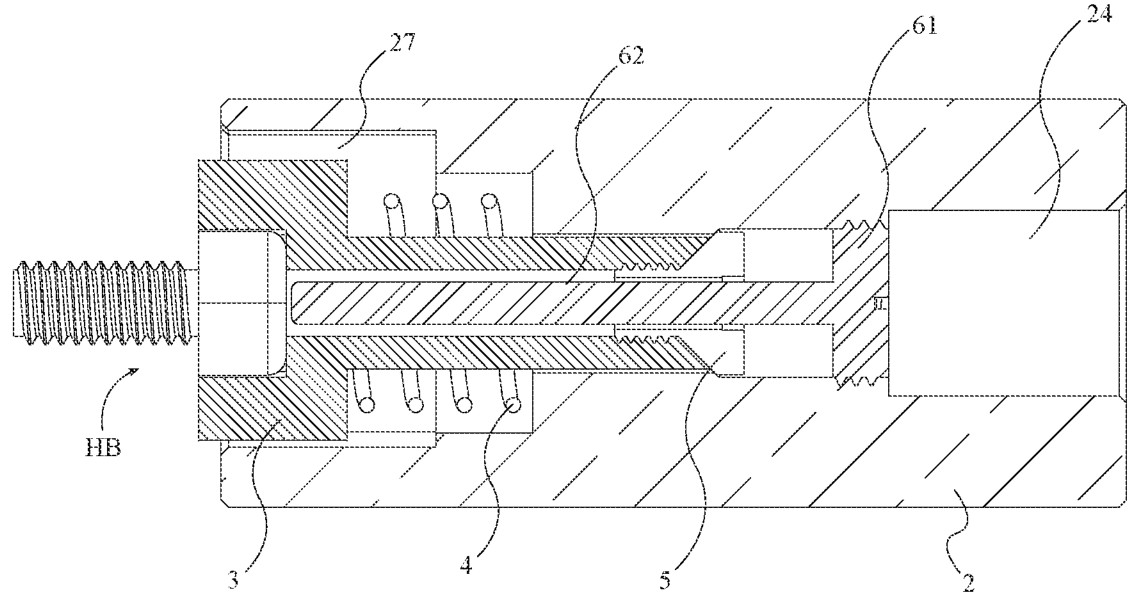
FIG. 12 is a front elevational view taken from FIG. 11, showing the plunger extended.
Figure 13:
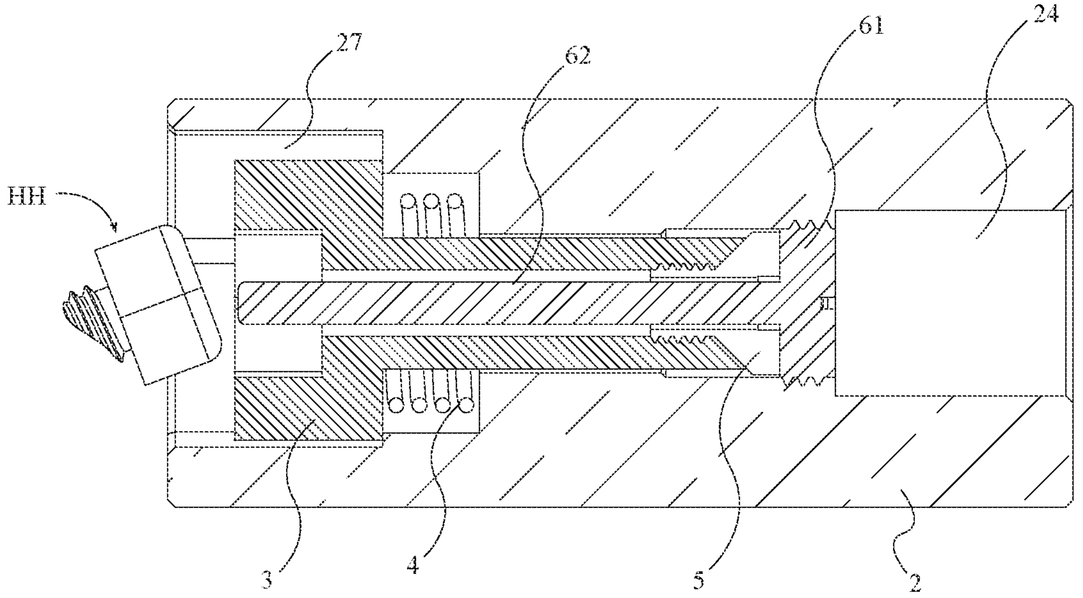
FIG. 13 is a front elevational view taken from FIG. 11, showing the plunger retracted.

For locking the doors on underground equipment, it is standard practice in the industry to use a "one-time" padlock. These padlocks typically use a ⅜" hex bolt that is tightened until the head of the bolt breaks off. Once broken off, the locked equipment is inaccessible, requiring a cutting tool to break the lock. The present invention eliminates the need to carry additional tools for locking these equipment doors. In particular, the spring-loaded plunger 3 has a recessed opening 33 shaped to fit a ⅜" hex-head. As illustrated in FIGS. 11-13, the user simply attaches the plunger head 31 to the hex-bolt HB and tightens down the hex-bolt until the hex-head HH breaks off from the shank.

In the event the hex-head HH remains lodged inside the plunger 3 after it is broken off, the user can activate the hex-head removal feature on the device to easily remove the broken off hex-head. In particular, an ejector pin 6 is mounted inside the device that slidably engages with a plunger channel 34. During normal use, as illustrated in FIG. 12, the tip 63 of the ejector pin 6 is positioned back behind the recessed opening 33 of the plunger head 31. This provides sufficient space to fit and tighten the hex-bolt HB. If the hex-head HH remains lodged inside the plunger 3 after the hex-head breaks off, the user can press down on the plunger head 31, causing the plunger 3 to slide back into the socket body 2. Because the ejector pin 6 remains fixed to the socket body 2, the tip 63 of the ejector pin 6 slides through the plunger channel 34 and pushes the hex-head HH out of the recessed opening 33, as illustrated in FIG. 13.

Figure 1:
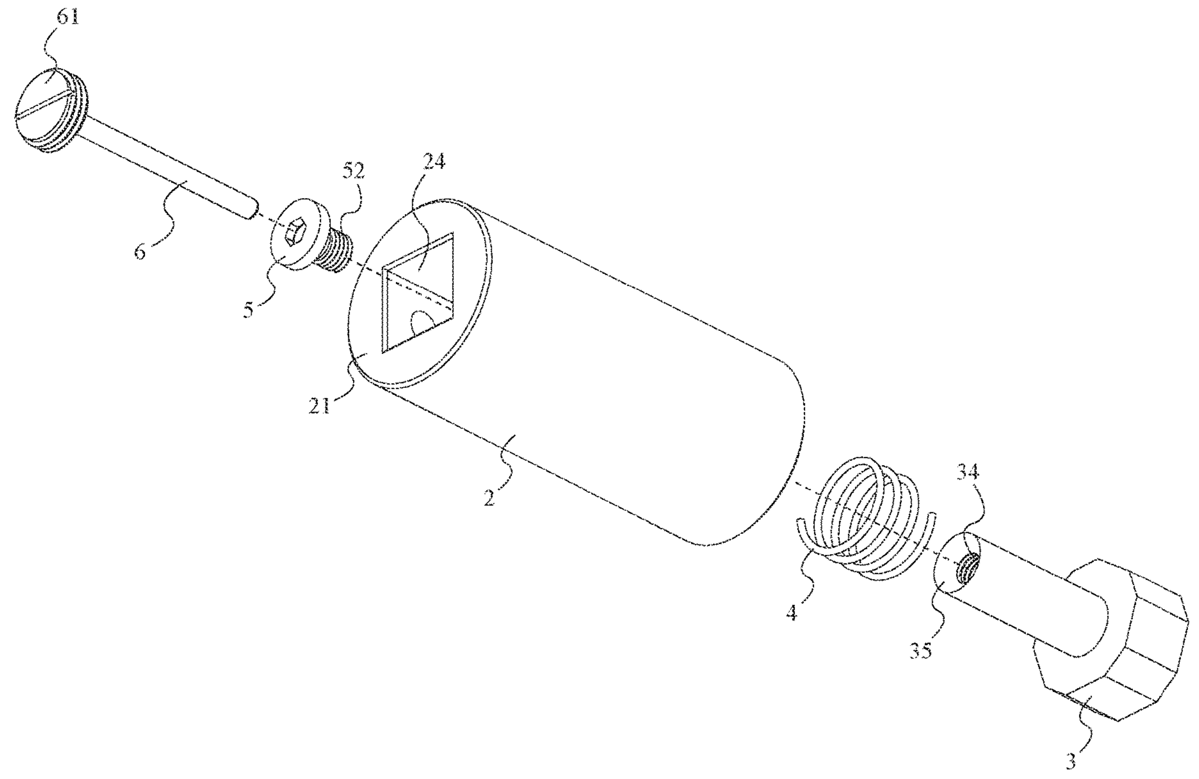
FIG. 1 is a bottom-rear-right perspective exploded view of the present invention.
Figure 2:
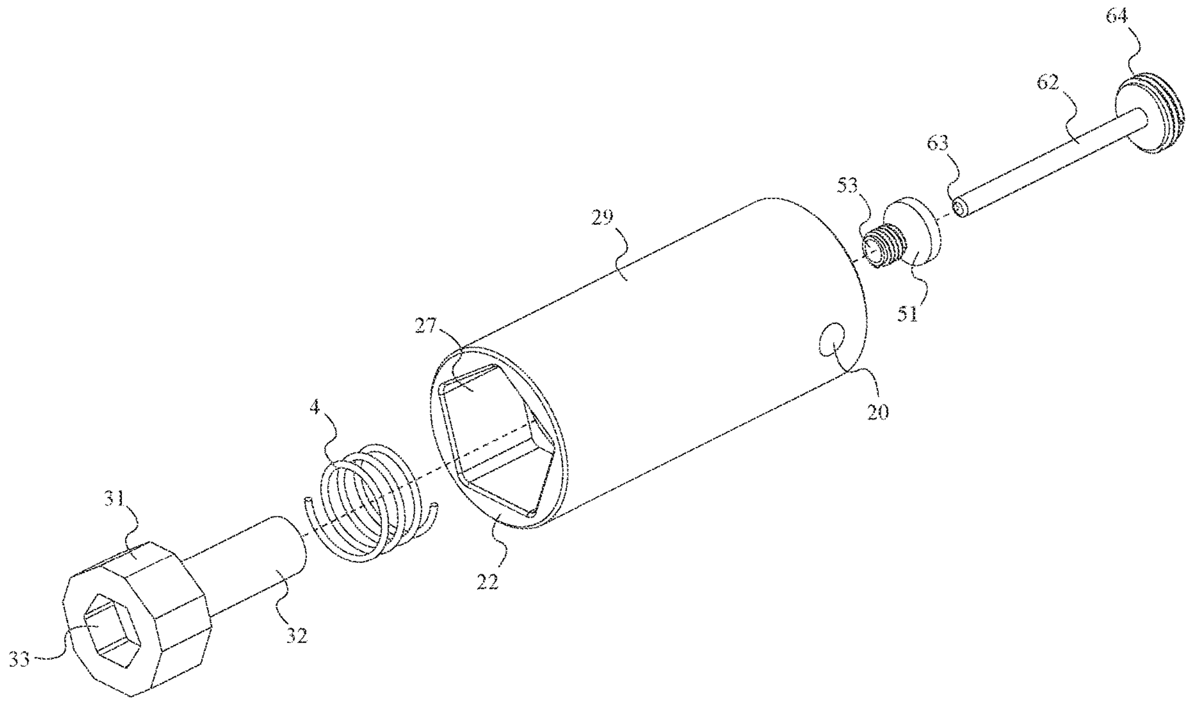
FIG. 2 is a top-front-left perspective exploded view of the present invention.
Figure 3:
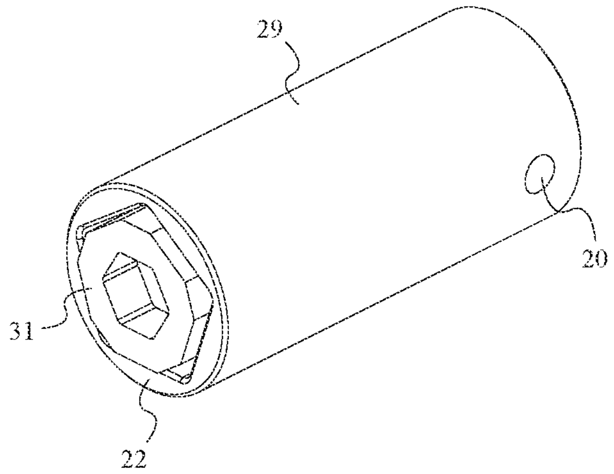
FIG. 3 is a top-front-left perspective view of the present invention.
Figure 4:
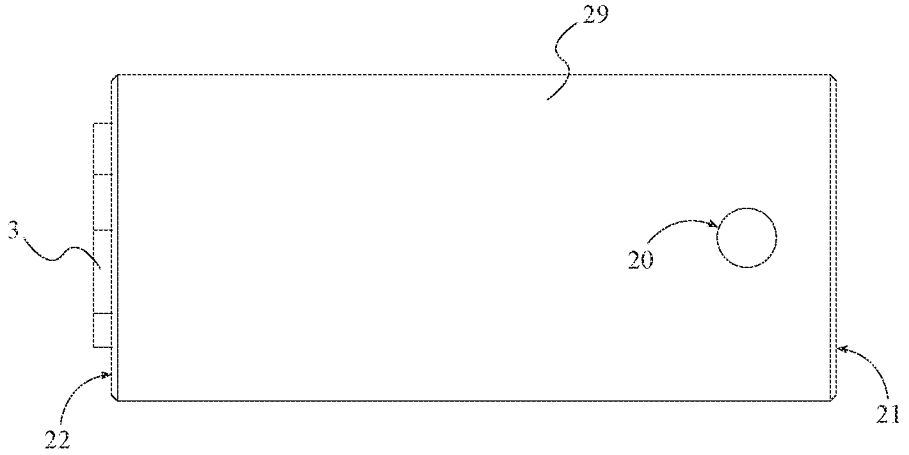
FIG. 4 is a front elevational view of the present invention.

As best seen in FIGS. 1-3, the present invention comprises a socket body 2, a plunger 3, a spring 4, a guide screw 5, and an ejector pin 6. The present invention can easily be assembled using common household tools. In particular, the plunger 3 is first inserted through the spring 4. Together, the plunger 3 and the spring 4 are then inserted into the fourth opening 27 located on the head end side. On the drive end side, the guide screw 5 is first inserted through the first opening 24 and into the second opening 25. The guide screw 5 is then fastened to the plunger stem 32 located within the third opening 26. Lastly, the ejector pin 6 is inserted into the first opening 24 on the drive end side and fastened to the threaded portion 251 of the second opening 25.

Figure 7:
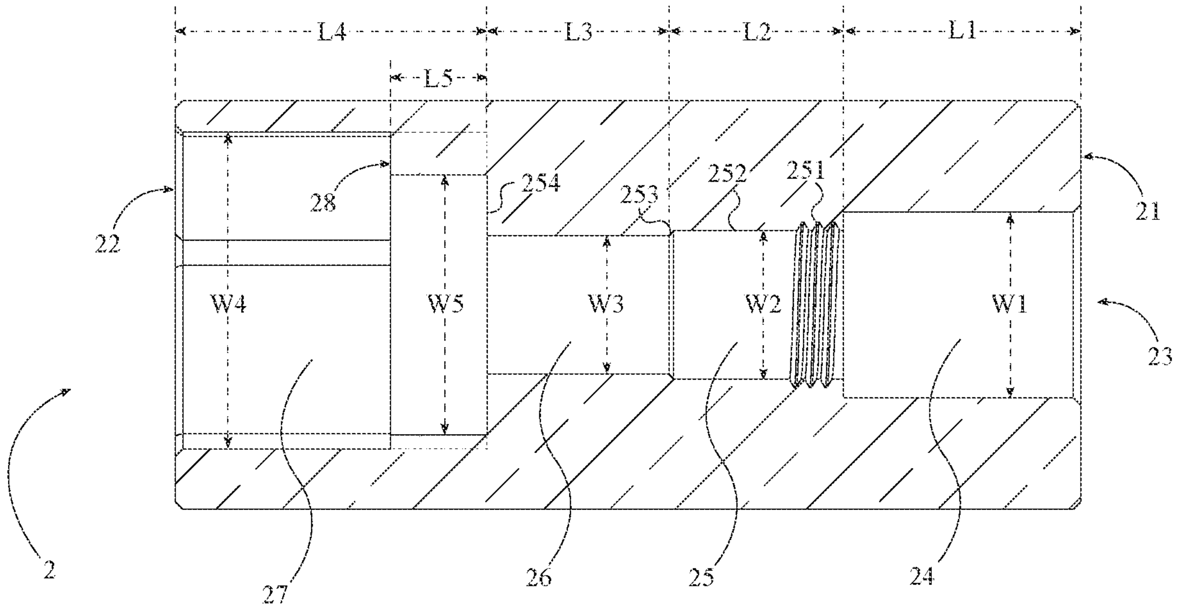
FIG. 7 is a front elevational cutaway view of the socket body, showing the internal structure.

In reference to FIG. 7, the socket body 2 functions as the primary structural component of the present invention, as the remaining components of the present invention are configured upon the socket body 2. The socket body 2 is cylindrical in shape, and further comprises a drive end 21, a head end 22, and a plurality of openings 23. More specifically, the drive end 21 and the head end 22 are axially aligned and in communication with each other, via the plurality of openings 23. The plurality of openings 23 further comprises a first opening 24, a second opening 25, a third opening 26, and a fourth opening 27.

Starting from the drive end 21, the first opening 24 extends axially inward from the drive end 21 to a predefined depth L1. Preferably, the first opening 24 is a square counterbore sized to fit the drive square of a turning tool, such as a ratchet or wrench. However, the profile shape of the first opening 24 is not limited and can take the form of any suitable shape based on design, user, and/or manufacturing requirements. A first opening width W1 is larger than a second opening diameter W2. Stated another way, the first opening 24 is larger diameter-wise than the second opening 25. This arrangement allows the ejector head 61 to seat flush up against the back surface leading to the second opening 25, which in turn, provides clearance to insert the drive square of the socket wrench to the first opening 24.

The second opening 25 is cylindrical in shape, extending axially inward from the first opening 24 to a predefined depth L2. A second opening diameter W2 is defined by the outer diameter of the guide screw 5. The depth L2 of the second opening 25 is defined by the desired length of travel of the plunger 3. More specifically, as the plunger 3 is pressed into the socket body 2, the guide screw 5 slides axially outward along the second opening 25 towards the first opening 24. As such, a sufficient depth is needed to prevent the guide 5 screw from contacting the ejector head 61 at maximum length of travel.

In the preferred embodiment, the second opening 25 further comprises a threaded portion 251 and an unthreaded portion 252. The threaded portion 251 is disposed at the proximal end, adjacent to the first opening 24. In this arrangement, the external threads 64 of the ejector head 61 are configured to engage with the threaded portion 251 of the second opening 25, thereby securing the ejector pin 6 to the socket body 2. A third opening diameter W3 is smaller than the second opening diameter W2. This arrangement limits the length of travel of the guide screw 5, preventing the guide screw 5 from sliding out of the second opening 25 during normal operation.

In the preferred embodiment, the second opening 25 further comprises a tapered end 253. The tapered end 253 is positioned on a distal end of the unthreaded portion 252, adjacent to the third opening 26. The tapered end 253 is configured to match the tapered head 51 of the guide screw 5. This allows for smooth engagement between the guide screw 5 and the tapered end 253, which in turn, improves the longevity and durability of the present invention.

The third opening 26 is cylindrical in shape, extending axially inward from the second opening 25 to a predefined depth L3. The third opening diameter W3 is defined by the profile shape of the plunger stem 32. In this arrangement, the plunger stem 32 slidably engages with the third opening 26.

The fourth opening 27 is a pentagon-shaped counterbore, extending axially inward from the head end 22 to the third opening 26. Moreover, the fourth opening 27 is in communication with the third opening 26. A depth L4 of the fourth opening 27 is defined by the distance from the head end 22 to the third opening 26. In this arrangement, the fourth opening 27 is configured to hold the plunger 3 and the spring 4 into position, wherein the spring 4 surrounds the plunger stem 32 and the plunger head 31 slidably engages with the fourth opening 27. The spring 4 is preferably a compression spring. However, other types of springs may be employed, including but not limited to a conical spring and a coil spring. A fourth opening width W4, measured from any flat surface of the pentagon to an opposing vertex, is larger than the third opening diameter W3. Stated another way, the fourth opening 27 is larger diameter-wise than the third opening 26. This difference in opening size forms a backing surface 254 at the distal end of the fourth opening 27. The backing surface 254 functions as a backstop for the spring 4 to apply resistive pressure on the back of the plunger head 31. When pressed up against a penta-bolt head, the plunger 3 retracts inward into the socket body 2 to allow proper engagement between the penta-bolt head and the fourth opening 27. Once the penta-bolt head is fully inserted, the user can then tighten or loosen the penta-bolt PB.

In the preferred embodiment, the socket body 2 further comprises a plunger backstop 28. Preferably, the plunger backstop 28 is perimetrically integrated into the fourth opening 27, extending axially outward from backing surface 254 towards the head end 22 at a predefined length L5. The plunger backstop 28 has an opening diameter W5 that is larger than the third opening diameter W3, but smaller than the fourth opening width W4. In other words, the opening diameter W5 of the plunger backstop 28 is of sufficient size to provide clearance for the spring 4, but not clearance for the plunger head 31. As illustrated in FIGS. 9-10, the plunger backstop 28 prevents the spring 4 from bottoming out by restricting the length of travel of the plunger 3. In other embodiments, the plunger backstop 28 can be in the form of a plurality of spacers adapted to fit within the fourth opening 27.

Figure 5:
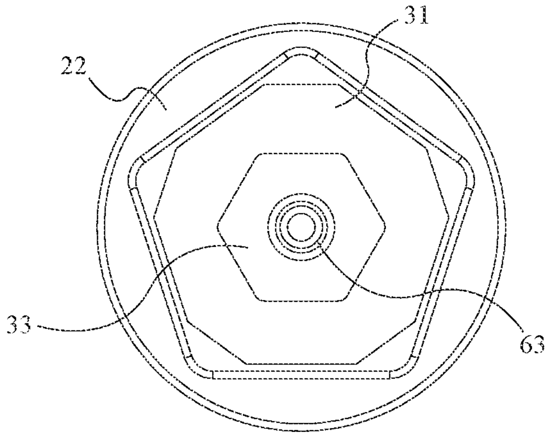
FIG. 5 is a left-side elevational view of the present invention.
Figure 6:
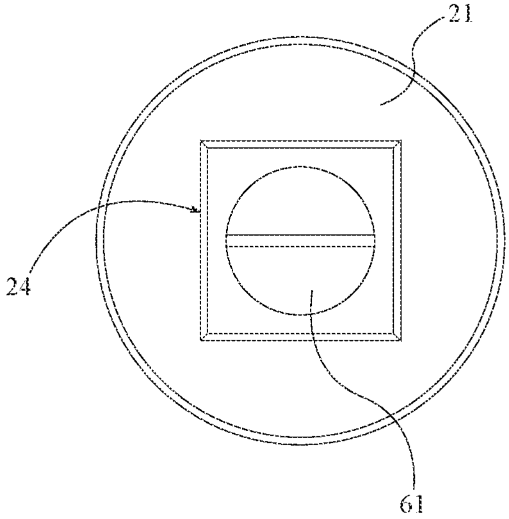
FIG. 6 is a right-side elevational view of the present invention.

The plunger 3 further comprises a plunger head 31, a plunger stem 32, a recessed opening 33, and a plunger channel 34. As best seen in FIG. 5, the plunger head 31 is contoured to match the pentagon-shaped opening at the head end 22 of the socket body 2. The plunger stem 32 is terminally connected to the back side of the plunger head 31, extending outward opposite of the plunger head 31. The recessed opening 33 is hex-shaped and traverses axially inward from the plunger head 31 to a predefined depth. As previously mentioned, the recessed opening 33 is sized to fit and engage with a hex-head bolt HB commonly used on "one-time use" padlocks in the utility industry. The plunger channel 34 traverses axially through the plunger stem 32 and through the recessed opening 33, the diameter of which is predefined. In particular, the plunger channel 34 is sized to allow sufficient clearance for the ejector pin 6 to slide through. A distal end 35 of the plunger stem 32 is adapted to connect to the guide screw 5. More specifically, the distal end 35 of the plunger stem 32 is countersunk and has internal threads configured to engage with external threads on the guide screw 5.

The guide screw 5 further comprises a tapered head 51, a guide stem 52, and a guide channel 53. As previously mentioned, the guide screw 5 is configured to slidably engage with the second opening 25 and is prevented from sliding out, due to the tapered end 253 of the second opening 25. As best seen in FIGS. 8-9, the tapered head 51 is cylindrical in shape, tapering down to the guide stem 52. The guide stem 52 is terminally connected to the back side of the tapered head 51, extending outward opposite of the tapered head 51. The guide stem 52 has external threads that are configured to engage with the internal threads of the plunger stem 32. Thus, the guide screw 5 and the plunger 3 are detachably connected to each other and slidably engage with the socket body 2. The guide channel 53 traverses axially through the guide screw 5, the diameter of which is predefined. In particular, the guide channel 53 is sized to allow sufficient clearance for the ejector pin 6 to slide through.

The ejector pin 6 further comprises an ejector head 61, a rod 62, and a rod tip 63. As previously mentioned, the ejector pin 6 is configured to remain fixed to the socket body 2, thus allowing the rod tip 63 to slide past the recessed opening 33 in the plunger 3 and make contact with the lodged hex-head HH. As best seen in FIG. 8-9, the ejector head 61 is cylindrical in shape, having external threads 64. A recessed notch traverses laterally across the top surface of the ejector head 61. This arrangement allows the user to secure the ejector head 61 to the threaded portion 251 of the socket body 2, using any household tool such as a flat-head screwdriver. The rod 62 is terminally connected to the bottom surface of the ejector head 61, extending outward opposite of the ejector head 61. The diameter and length of the rod 62 are defined by the plunger channel 34 and the guide channel 53. The rod tip 63 is terminally connected to the distal end of the rod 62.

In other embodiments, the rod 62 is detachably connected to the ejector head 61 using any conventional means known in the art, including but not limited to threaded engagement and adhesive bonding.

In the preferred embodiment, as best seen in FIG. 3, a side hole 20 is disposed on the outer surface 29 of the socket body 2, traversing laterally inward into the first opening 24. The side hole 20 is configured to align and attach to the spring-loaded ball bearing of a turning tool (e.g., socket wrench). This arrangement firmly secures the socket body 2 to the turning tool.

Although the invention has been explained in relation to its preferred embodiment, it is to be understood that many other possible modifications and variations can be made without departing from the spirit and scope of the invention.

What is claimed is:

1. A multi-purpose drive socket comprising:
- a socket body;
- a plunger;
- a guide screw;
- the socket body comprising a drive end, a head end, and a plurality of openings;
- the plurality of openings comprising a first opening, a second opening, a third opening, and a fourth opening;
- the first opening extending axially inward from the drive end;
- the first opening being larger diameter-wise than the second opening;
- the second opening extending axially inward from the first opening;
- the second opening being larger diameter-wise than the third opening;
- the third opening extending axially inward from the second opening to the fourth opening;
- the fourth opening extending axially inward from the head end;
- the fourth opening being larger diameter-wise than the third opening;
- the plunger further comprising a plunger head and a plunger stem;
- a recessed opening being disposed on the plunger head, extending axially inward;
- the plunger head being slidably engaged with the fourth opening;
- the plunger stem being slidably engaged with the third opening;
- the guide screw being slidably engaged with the second opening;
- a distal end of the plunger stem being adapted to connect to the guide screw;
- the fourth opening being adapted to engage a penta-head bolt; and
- the recessed opening being adapted to engage a hex-head bolt.

2. The multi-purpose drive socket as claimed in claim 1 comprising:
- an ejector pin;
- the ejector pin comprising an ejector head, a rod, and a rod tip;
- the ejector head having external threads;

the second opening further comprising a threaded portion;

a guide channel traversing through the guide screw;

a plunger channel traversing through the plunger stem and the recessed opening;

the ejector head being configured to engage the threaded portion;

the rod traversing through the guide channel and the plunger channel; and the rod tip capable of ejecting a hex-head lodged in the recessed opening.

3. The multi-purpose drive socket as claimed in claim 2 comprising:

a spring;

the socket body further comprising a backing surface;

the backing surface formed at a distal end of the fourth opening;

the spring surrounding the plunger stem; and the spring positioned between the backing surface and the plunger head.

4. The multi-purpose drive socket as claimed in claim 3 comprising:

the socket body further comprising a plunger backstop;

the plunger backstop extending axially outward from the backing surface towards the head end at a predefined length; and an opening of the plunger backstop being smaller diameter-wise than the fourth opening.

5. The multi-purpose drive socket as claimed in claim 2, wherein the first opening is a square counterbore.

6. The multi-purpose drive socket as claimed in claim 5, wherein the rod is detachably connected to the ejector head.

7. The multi-purpose drive socket as claimed in claim 1 comprising:

the second opening further comprising a tapered end;

the tapered end being positioned adjacent to the third opening;

the guide screw further comprising a tapered head; and the tapered head being configured to engage the tapered end.

8. The multi-purpose drive socket as claimed in claim 7 comprising:

the socket body further comprising a side hole;

the side hole traversing laterally inward into the first opening; and the side hole being configured to detachably connect a socket wrench to the socket body.

* * * * *